United States Patent [19]
Nasby

[11] Patent Number: 4,854,880
[45] Date of Patent: Aug. 8, 1989

[54] WARDROBE COLOR COORDINATION KIT

[76] Inventor: James A. Nasby, 7730 Marth Court, Edina, Minn. 55435

[21] Appl. No.: 189,821

[22] Filed: May 3, 1988

[51] Int. Cl.$^4$ .................... G09F 9/00; G09F 11/00; G09F 3/00
[52] U.S. Cl. .................... 434/395; 434/402; 434/426; 434/433; 40/503; 40/322
[58] Field of Search .............. 434/395, 206, 208, 402; 40/503, 524, 322

[56] References Cited

U.S. PATENT DOCUMENTS

| | | |
|---|---|---|
| 1,582,122 | 4/1926 | Clapp . |
| 1,629,330 | 5/1927 | Adler . |
| 1,733,539 | 10/1929 | Hertel . |
| 2,221,774 | 11/1940 | Bowser . |
| 2,624,140 | 1/1953 | Neilson .................... 40/503 |
| 3,040,448 | 6/1962 | Paxton . |
| 4,679,340 | 7/1987 | Johansson .................... 40/322 |

*Primary Examiner*—Edward M. Coven
*Assistant Examiner*—V. Szcepanik
*Attorney, Agent, or Firm*—Jerry T. Kearns

[57] ABSTRACT

A wardrobe color coordination kit for enabling men and women to rapidly select color coordinated outfits utilizes numbered tags which are secured to various major clothing items. Short cylindrical numbered tags are also provided for attachment to conventional clothes hangers. A rotary file displays color coordinated clothing combinations through a front transparent window. Numbered blocks within the file are removably retained on an endless link belt which is received around spaced sprockets. A ratchet mechanism is provided to increment the belt to display the next row of color coordinated clothing key numbers through the front transparent window. The numbered blocks are mounted on the link belt so as to be indexable for displaying four different numbered sides of the block. The blocks may also be easily removed and replaced with other differently numbered blocks. A drawer is provided at the lower end of the rotary file for storage of a spare supply of numbered blocks.

8 Claims, 7 Drawing Sheets

FIG 5

WARDROBE COLOR COORDINATION KIT

BACKGROUND OF THE INVENTION

1. Field of the Invention

The present invention relates to color coordination kits, and more particularly pertains to a new and improved wardrobe color coordination kit for enabling men and women to rapidly select color coordinated wardrobe outfits. Many men and women suffer from color blindness and are thus unable to select color coordinated wardrobe outfits from their closet. Additionally, many men and women do not have the ability to select tastefully coordinated outfits or lack the time to select an outfit each day. In order to solve these problems, the present invention provides a color coordination kit which utilizes numbered tags for securement to major clothing items and hangers. A rotary file displays each possible grouping of color coordinated wardrobe items through a front transparent window.

2. Description of the Prior Art

Various types of color coordination kits are known in the prior art. A typical example of such a color coordination kit is to be found in U.S. Pat. No. 1,582,122, which issued to G. Clapp on Apr. 27, 1926. This patent discloses a color wheel having an enclosed wheel provided with a circular peripheral array of circles having various skin complexion colors. The device is utilized for enabling a dentist to match the color of artificial teeth to a patient's skin coloring. U.S. Pat. No. 1,629,330, which issued to H. Adler on May 17, 1927, discloses a color coordination device which utilizes a plurality of imprinted overlying charts to enable women to match wardrobe items to their hair and skin colors. U.S. Pat. No. 1,733,539, which issued to C. Hertel on Oct. 29, 1929, discloses a color coordination device which utilizes a pair of overlying relatively slidable charts to enable women to select color coordinated wardrobe items. U.S. Pat. No. 2,221,774, which issued to B. Bowser on Nov. 19, 1940, discloses a color coordination chart which utilizes relatively slidable overlying charts for selecting color coordinated wardrobe items. U.S. Pat. No. 3,040,448, which issued to J. Paxton on June 26, 1962, discloses a color coordination kit which utilizes a chart having an attached row of color coordinated hangers. Color coordinated wardrobe items are selected by referencing the hanger colors to those indicated on the attached chart.

While the above mentioned devices are suited for their intended usage, none of these devices provide a color coordination kit which utilizes variously numbered tags secured to major clothing items in conjunction with a rotary file of numbered blocks arranged to indicate various possible color coordinated wardrobe outfits. Additionally, none of the aforesaid devices include a ratchet actuated rotary file which removably receives indexable numbered blocks for selectively displaying various color coordinated wardrobe outfit combinations. Inasmuch as the art is relatively crowded with respect to these various types of color coordination kits, it can be appreciated that there is a continuing need for and interest in improvements to such color coordination kits, and in this respect, the present invention addresses this need and interest.

SUMMARY OF THE INVENTION

In view of the foregoing disadvantages inherent in the known types of color coordination kits now present in the prior art, the present invention provides an improved wardrobe color coordination kit. As such, the general purpose of the present invention, which will be described subsequently in greater detail, is to provide a new and improved ward robe color coordination kit which has all the advantages of the prior art color coordination kits and none of the disadvantages.

To attain this, a representative embodiment of the concepts of the present invention is illustrated in the drawings and makes use of a plurality of numbered tags which are secured to various major clothing items. Short cylindrical numbered tags are also provided for attachment to conventional clothes hangers. A rotary file displays color coordinated major clothing numbers through a front transparent window. Numbered blocks within the file are removably retained on an endless link belt which is received around spaced sprockets. A ratchet mechanism is provided to increment the belt to display the next row of color coordinated clothing key numbers through the front transparent window. The numbered blocks are mounted on the link belt so as to be indexable for displaying four different numbered sides of the block. The blocks may also be easily removed and replaced with other differently numbered blocks. A drawer is provided at the lower end of the rotary file for storage of a spare supply of numbered blocks.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wardrobe color coordination kit which has all the advantages of the prior art color coordination kits and none of the disadvantages.

It is another object of the present invention to provide a new and improved wardrobe color coordination kit which may be easily and efficiently manufactured and marketed.

It is a further object of the present invention to provide a new and improved wardrobe color coordination kit which is of a durable and reliable construction.

An even further object of the present invention is to provide a new and improved wardrobe color coordination kit which is susceptible of a low cost of manufacture with regard to both materials and labor, and which accordingly is then susceptible of low prices of sale to the consuming public, thereby making such color coordination kits economically available to the buying public.

Still yet another object of the present invention is to provide a new and improved wardrobe color coordination kit which provides in the apparatuses and methods of the prior art some of the advantages thereof, while simultaneously overcoming some of the disadvantages normally associated therewith.

Still another object of the present invention is to provide a new and improved wardrobe color coordination kit which enables men and women to rapidly select tastefully coordinated wardrobe outfits.

Yet another object of the present invention is to provide a new and improved wardrobe color coordination kit which utilizes a plurality of variously numbered tags secured to major clothing items in conjunction with a rotary file to enable men and women to quickly select tastefully coordinated wardrobe outfits.

Even still another object of the present invention is to provide a new and improved wardrobe color coordination kit which utilizes a ratchet actuated rotary file for displaying various possible color coordinated outfits.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

File 6 is a cross sectional view, taken along line 6—6 of FIG. 3, further illustrating the internal construction of the rotary file.

DESCRIPTION OF THE PREFERRED EMBODIMENT

Figure 1:
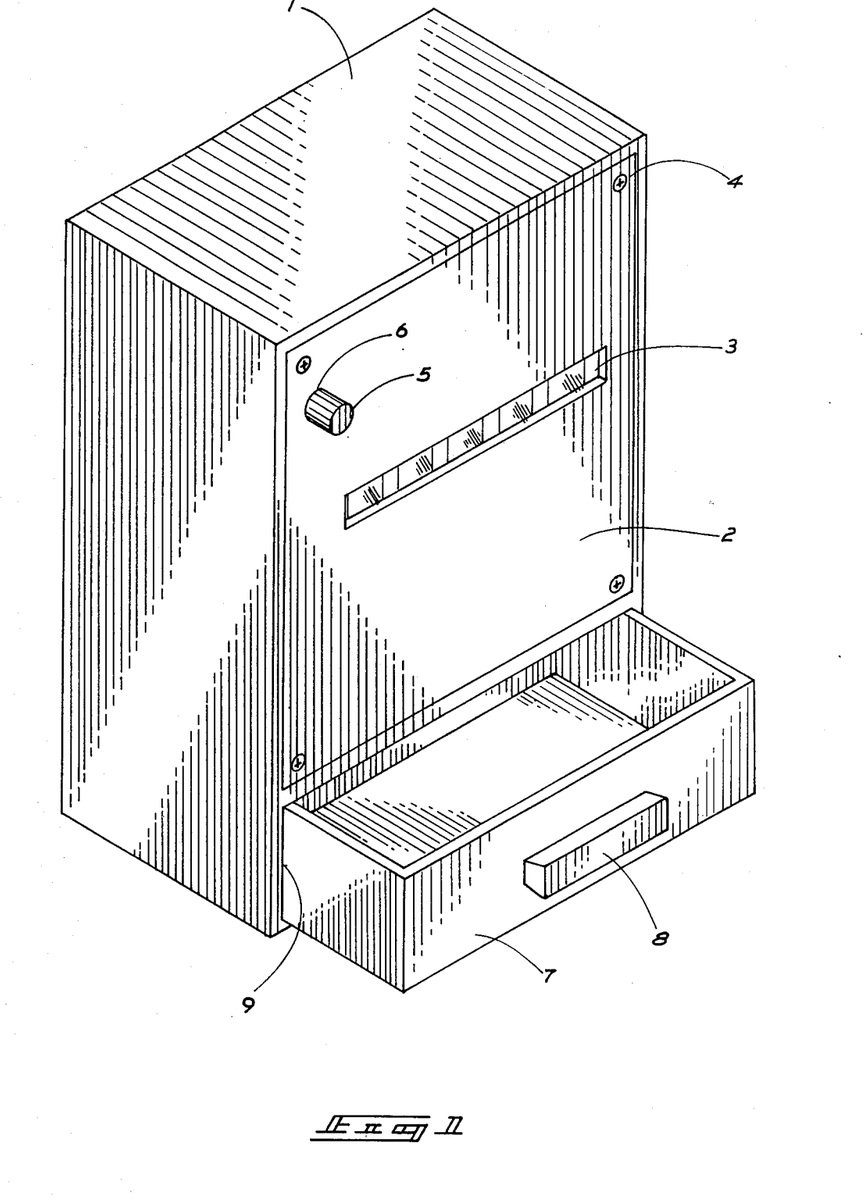
FIG. 1 is a perspective view of the rotary file of the wardrobe color coordination kit of the present invention.

With reference now to the drawings, and in particular to FIG. 1 thereof, a new and improved wardrobe color coordination kit embodying the principles and concepts of the present invention will be described.

More specifically, it will be noted that the first embodiment of the invention includes a generally rectangular housing 1 having a rectangular front cover 2. An elongated transparent rectangular window 3 extends transversely across the front cover 2. The cover is secured to the housing 1 by a plurality of screws 4. One row of an endless belt, provided with a plurality of rows of adjacent numbered blocks, is visible through the transparent window 3. A ratchet actuation button 5 extends through an aperture 6 in the cover 2. By depressing the ratchet actuation button 5, the endless belt within the interior of the housing 1 will be incremented one row, thus displaying the next adjacent row through the window 3. A drawer 7 is received in a rectangular recess g within the bottom portion of the housing 1. A handle 8 is provided for manipulation of the drawer 7.

Figure 2:
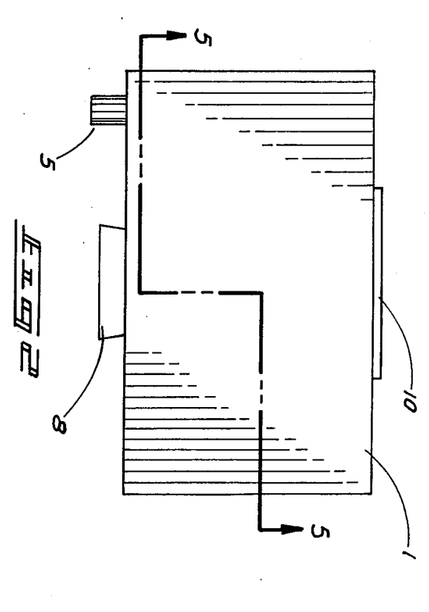
FIG. 2 is a top view of the rotary file.

As shown in the top View of FIG. 2, an adhesive backing 10 is provided on the back wall of the housing 1 for securing the housing 1 to a vertical surface such as a wall or closet door. Other conventional securing means such as hooks or loops may be substituted for the adhesive backing 10.

Figures 3, 4:
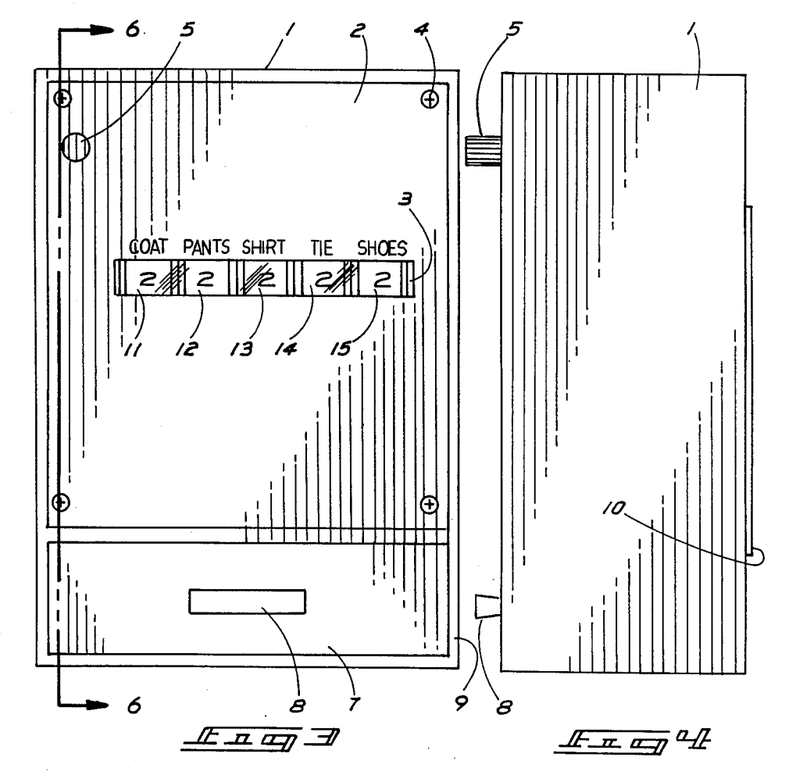
FIG. 3 is a front view of the rotary file.
FIG. 4 is a side view of the rotary file.

As shown in the front view of FIG. 3, a row of color coded wardrobe items is displayed through the front transparent window 3. As illustrated, the row consists of five adjacent columns 11, 12, 13, 14, 15 of numbered blocks with each column representing a different major clothing item. For purposes of illustration, these columns have been consecutively labelled "COAT, PANTS, SHIRT, TIE, SHOES". It is to be understood that these columns can be labelled to indicate items of women's clothing without departing from the scope of the present invention.

In FIG. 4, a side view of the housing 1 is provided.

Figure 5:
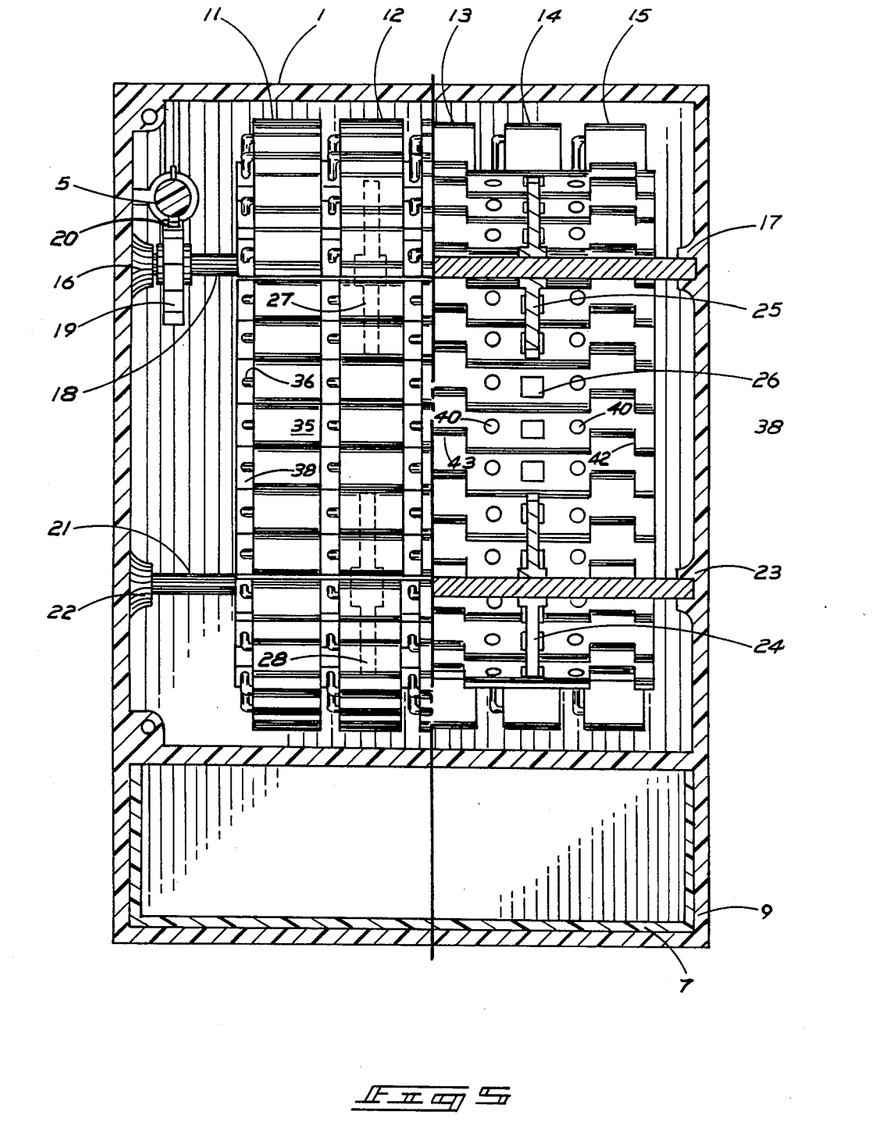
FIG. 5 is a cross sectional view, taken along line 5—5 of FIG. 2, illustrating the internal construction of the rotary file.

In FIG. 5, a cross sectional view taken along line 55 of FIG. 2, illustrates the internal construction details of the rotary file. Five columns 11, 12, 13, 14 and 15 of blocks 35 are secured to an endless link belt. Each link 38 of the belt mounts a row of five adjacent blocks 35. A pair of rotary shafts 18 and 21 are mounted for rotation within the housing 1 by bearing blocks 16, 17, 22 and 23. The shafts 18 and 21 extend in longitudinally spaced relation transversely across the interior of the housing 1. A pair of spaced gears 25 and 27 are secured for rotation with the shaft 18. A second pair of gears 24 and 28 are secured for rotation with the shaft 21. The teeth of each of the gears 25, 27, 24 and 28 engage recesses 26 formed in the back side of each of the links 38. A ratchet wheel 19 secured to the shaft 18 is engaged by a pawl 20 of the ratchet actuation button 5. As may now be readily understood, when the ratchet actuation button 5 is depressed, the ratchet wheel 20 will be rotated one increment, thus rotating the shaft 18 and attached gears 25 and 27. Engagement of the gears 25 and 27 with the endless belt links 38 via recesses 26 causes the endless belt to be rotated one increment. The rotation of the endless belt causes the idler shaft 21 and attached gears 24 and 28 to be rotated, thus providing a complete rotary support for the endless belt. As the endless belt is rotated one increment, the next row of five adjacent blocks 35 will be displayed through the front transparent window 3 of the housing 1. Each numbered block 35 is secured by a right angle mounting pin 36 to one of the links 38. By a mechanism to be subsequently described in greater detail, each block 35 may be selectively rotated about the right angle pin 36, thus allowing four differently numbered faces of each block 35 to be selectively displayed. By virtue of this arrangement, different color coded combinations of wardrobe items may easily be arranged on the endless belt. The bottom ends of the right angle mounting pins 36 extend to the back side of each of the links 38, where they may be seen at 40 on the right hand side of FIG. 5. Each link 38 is provided with a plurality of notches 42 which cooperate with tabs 43 of an adjacent link 38. These tabs 43 are pivotally secured by a hinge pin within the notches 42, thus forming an endless link belt.

In FIG. 6, a cross sectional view taken along line 66 further illustrates the internal construction of the rotary file. The ratchet actuation button 5 extends outwardly through a circular aperture 6 in the front cover 2. A ratchet pawl 20 is slidably received in a stepped cylindrical bore 34 which extends transversely through the ratchet actuation button 5. A coil spring 30 received around the stem of the pawl 20 biases the pawl 20 outwardly into engagement with the teeth of the ratchet wheel 19. The end of the reduced diameter portion of the pawl 20 is slightly enlarged to retain the pawl 20 within the bore 34. As previously described, the ratchet wheel 19 is fixed for rotation with the shaft 18. A reduced diameter portion 32 of the ratchet actuation button 5 is received for sliding reciprocal movement within a cylindrical guide recess 29 formed adjacent a back interior portion of the housing 1. An enlarged countersunk portion 33 of the guide recess 29 receives a coil spring 31 which is received around the reduced diameter portion 32 of the ratchet actuation button 5. As may now be understood, when the ratchet actuation button 5 is depressed, it is forced to the left of FIG. 6, against the bias of the spring 31. This causes the pawl 20 to engage one tooth of the ratchet wheel 19, thus rotating the shaft 18 one increment. When the ratchet actuation button 5 is released, the sloping end surface of the pawl 20 slides back across the sloped surface of the tooth of the ratchet wheel 19, without further movement of the shaft 18. Thus, by repeatedly depressing and releasing the button 5, the endless belt formed of links 38 may be repeatedly incremented. In this fashion, each row of numbered blocks 35 may be sequentially displayed through the transparent window 3 in the cover 2. Each of the links 38 is pivotally connected to each adjacent link by a hinge pin 37.

Figure 7:
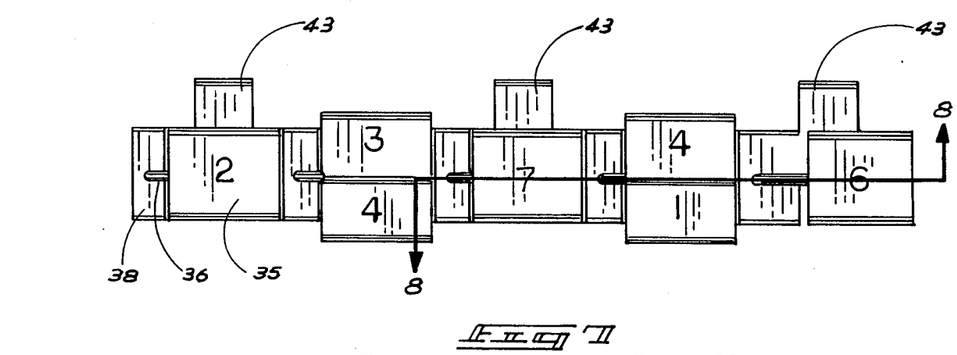
FIG. 7 is a top view of one link of the endless link belt of the rotary file.

With reference now to FIG. 7, the constructional details of the links 38 of the endless belt will now be further described. Each of the links 38 is provided with three spaced tabs 43 along one side wall portion thereof. Each of the links 38 mounts five numbered blocks 35 as illustrated. Each of the numbered blocks 35 is connected to the link 38 by a right angle mounting pin 36.

Figure 8:
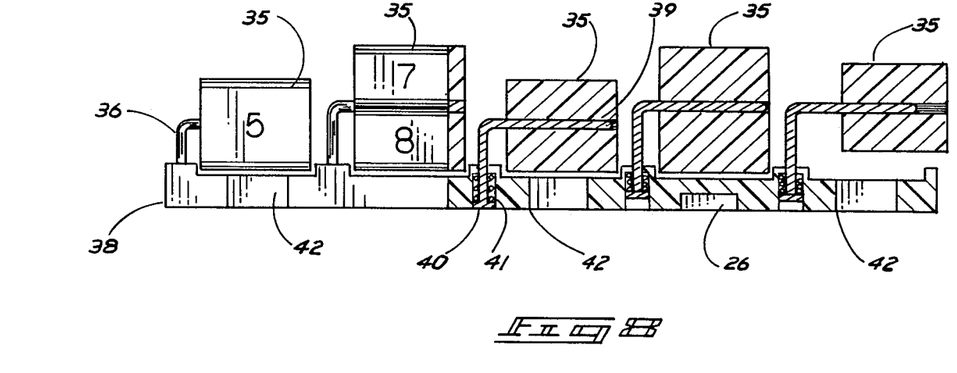
FIG. 8 is a cross sectional view, taken along line 8—8 of FIG. 7, illustrating the details of construction of the link.

As shown in FIG. 8, each of the blocks 35 has a central cylindrical bore 39 which receives one angled portion of the right angular mounting pin 36. The other angle portion of each pin 36 is provided with a circular enlarged end 40 which extends through an aperture in the link 38. A coil spring 41 abuts the enlarged end 40 of each of the pins 36, thus downwardly urging the pin 36. This causes each block 35 to be retained against the top surface of the link 38. Each of the blocks 35 may be rotated to display another numbered face by depressing the end 40 of the pin 36. This raises the block 35 upwardly above the link 38 and allows the block 35 to be rotated about the axis of the central bore 39. As illustrated at the extreme right hand portion of FIG. 8, each block 35 may be removed from the link 38 by depressing the enlarged portion 40 of the pin 36 and sliding the block 35 to the right, off of the pin 36. By virtue of this construction, the numbered blocks 35 may be selectively indexed to display any of four differently numbered faces, or may be entirely removed and replaced by a differently numbered block. This allows an extremely wide variety of color coordinated wardrobe outfits to be displayed by the rotary file.

Figure 9:
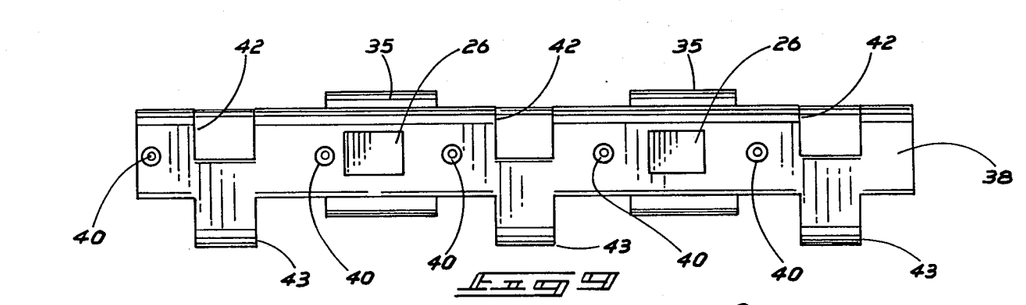
FIG. 9 is a bottom view of the link of FIG. 7.

In FIG. 9, a bottom view of the link 38 of FIG. 7 is provided. As illustrated, a plurality of spaced tabs 43 extend outwardly from one side edge of the link 38. A plurality of cooperating spaced notches 42 are formed in the opposite side wall of each of the links 38. When assembled to form an endless link belt, a hinge pin pivotally connects the tabs 43 of one link 38 within the notches 42 of an adjacent link.

Figure 10:
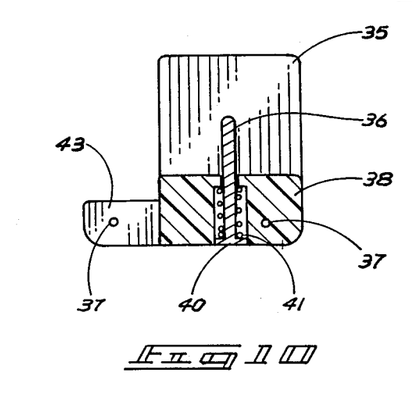
FIG. 10 is a transverse cross sectional view, illustrating the manner of connection of an indexable block to the link.

As shown in FIG. 10, a hinge pin 37 extends through the notches 43 and along the opposite side portion of each of the links 38. The vertical portion of each of the right angle mounting pins 36 extends through a stepped cylindrical aperture in the link 38. A coil spring 41, received around the vertical portion of the pin 36, engages an enlarged circular end 40 of the pin 36 and urges the pin 36 and attached block 35 downwardly against the upper surface of the link 38.

Figure 11:
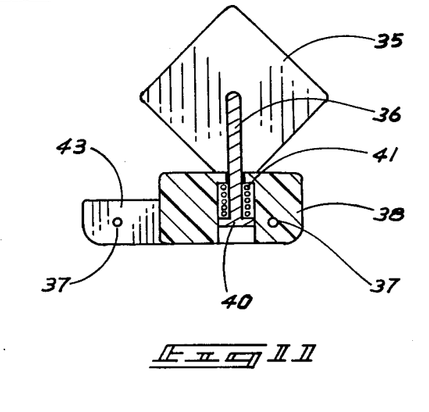
FIG. 11 is a transverse cross sectional view, similar to FIG. 10, illustrating the indexable block in the process of being rotated relative to the link.

As shown in FIG. 11, the enlarged portion 40 of the pin 36 may be urged upwardly against the bias of the spring 41, thus elevating the block 35 above the upper surface of the link 38, allowing the block 35 to be indexed around the axis of the horizontal portion of the right angle mounting pin 36.

Figures 12A, 12B, 12C:
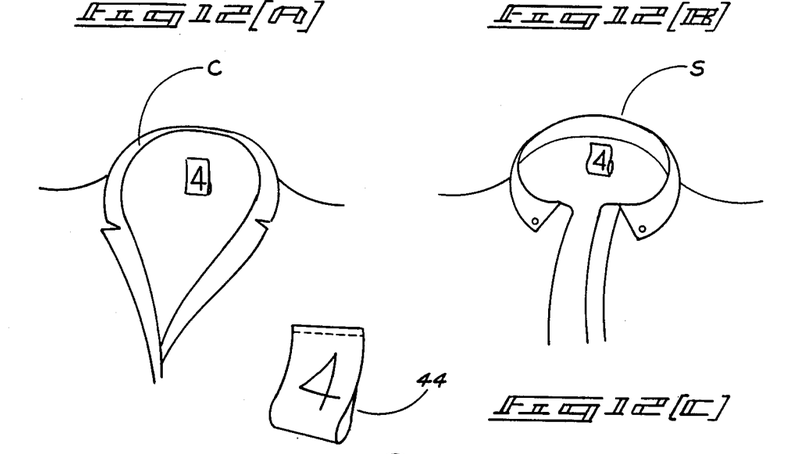
FIGS. 12(a), 12(b), and 12(c) illustrates of the manner of tagging shirts and coats with numbered tags.

In FIGS. 12(a), 12(b) and 12(c) illustrates a numbered tag 44 which may be sewn within various articles of clothing such as a shirt S or a coat C.

Figures 13A, 13B, 14A, 14B, 14C:
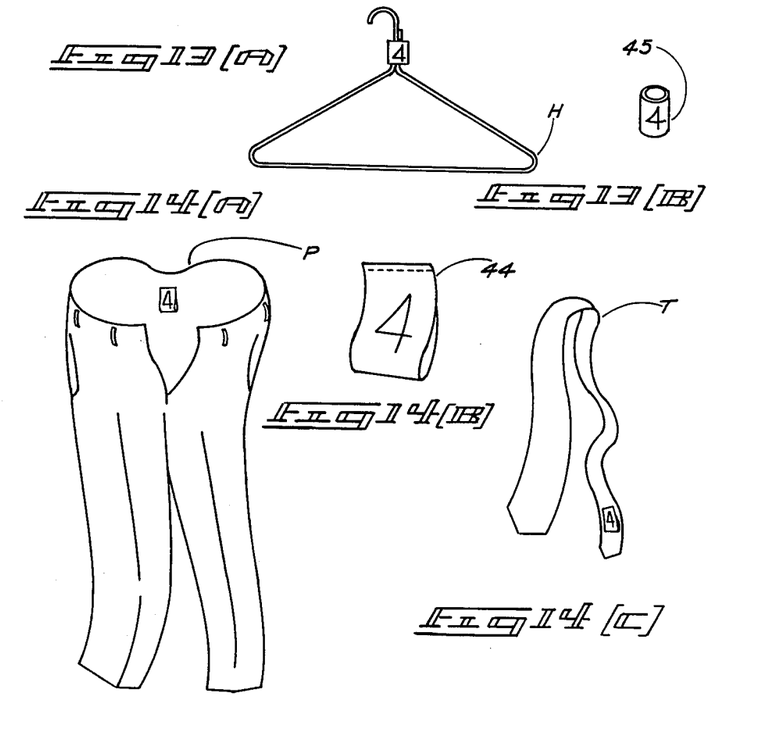
FIGS. 13(a) and 13(b) illustrates the cylindrical tubular numbered tag for use in tagging clothes hangers.
FIGS. 14(a), 14(b) and 14(c) illustrates the manner of tagging pants and neckties.

In FIGS. 13(a) and 13(b) a diagrammatic illustration is provided which depicts the manner of providing a tubular numbered cylindrical tag 45 to a clothes hanger H.

In FIGS. 14(a), 14(b) and 14(c) a diagrammatic illustration is provided depicting the manner of securing the numbered tag 44 within various other articles of clothing such as a pair of pants P, or a necktie T.

It is to be understood that the rotary file may be labeled with various articles of women's clothing for use in determining color coordinated wardrobe outfits for women, One of the major advantages of the rotary file of the present invention is that as additional wardrobe items are acquired, the additional possible color coordinated wardrobe combinations may easily be added to the endless belt by adding numbered blocks or by selectively indexing numbered blocks already present. The numbered blocks not in use may be conveniently stored in the drawer 7 at the bottom end of the housing 1. while the rotary file has been described in relation to five vertical columns 11, 2, 13, 14 and 15, it is to be understood that more or less columns may be utilized without departing from the scope of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and desired to be protected by Letters Patent of the United States is as follows:

1. A new and improved wardrobe color coordination kit, comprising;
    numbered tag means for association with various clothing articles in order to code them for color coordination;
    rotary file means for selectively displaying a variety of possible numbered sequences corresponding to said numbered tag means to indicate color coordinated wardrobe clothing outfits;
    said rotary file means including an endless link belt;
    a plurality of rows of numbered blocks on said link belt; and
    means mounting each of said blocks on said link belt for selective rotation or removal.

2. The wardrobe color coordination kit of claim 1, wherein said rotary file means further comprises ratchet means for selectively incrementing said endless link belt.

3. The wardrobe color coordination kit of claim 1, wherein said numbered tag means comprise a plurality of numbered tags adapted to be sewn on various clothing articles.

4. The wardrobe color coordination kit of claim 1, wherein said numbered tag means comprises a plurality of cylindrical tubular numbered tags adapted to be mounted on clothes hangers.

5. A new and improved wardrobe color coordination kit, comprising;
    numbered tag means for association with various clothing articles in order to code them for color coordination;
    rotary file means for selectively displaying a variety of possible numbered sequences corresponding to said numbered tag means to indicate color coordinated wardrobe clothing outfits;
    said rotary file means including an endless link belt formed from a plurality of pivotally connected links;
    a plurality of rows of numbered blocks on said link belt;
    a plurality of right angle mounting pins spaced along an upper surface of each of said links;
    a horizontal portion of each of said mounting pins extending through a central bore of one of said blocks;
    spring means operatively connected with each of said right angle mounting pins for urging each of said blocks against said upper surface of said links;
    ratchet means for selectively incrementing said endless link belt;
    said ratchet means including a pair of shafts rotatably mounted within a housing;
    a pair of gears secured for rotation on each of said shafts, said gears supporting said endless link belt;
    a ratchet wheel secured to one of said shafts; and
    ratchet actuation means extending through a front cover of said housing for incrementally rotating said ratchet wheel.

6. The wardrobe color coordination kit of claim 5, wherein each of said links has a first side edge provided with a plurality of spaced notches and a second side edge provided with a plurality of outwardly extending tabs.

7. The wardrobe color coordination kit of claim 6, further comprising hinge pin means pivotally connecting said spaced tabs of each of said links within said spaced notches of an adjacent link.

8. The wardrobe color coordination kit of claim 7, further comprising a pair of spaced recesses on a bottom surface of each of said links for engagement with said gears.

* * * * *